May 12, 1942. C. A. UPSON ET AL 2,282,624

FASTENER FOR WALLBOARDS AND THE LIKE

Filed Feb. 24, 1941

Inventors
Charles A. Upson
Ross Winship
BY Cumpston & Shepard
their Attorneys

Patented May 12, 1942

2,282,624

UNITED STATES PATENT OFFICE 2,282,624

FASTENER FOR WALLBOARDS AND THE LIKE

Charles A. Upson and Ross Winship, Lockport, N. Y., assignors to The Upson Company, Lockport, N. Y., a corporation of New York Application February 24, 1941, Serial No. 380,152

10 Claims. (Cl. 72—118)

This invention relates to means for fastening wallboard or similar panels to frame members.

An object of the invention is the provision of a fastener suitable for attaching wallboard to metal frame members, without the use of nails.

Another object is the provision of such a fastener so designed and constructed as to be particularly adapted for application to a T-shaped portion of a metal frame member, that is, for application to a flange presenting two free undercut edges extending on opposite sides of a central web or flange.

A further object is the provision of such a fastener so designed and constructed as to be capable of being placed quickly and easily upon a metal frame member, and to be capable of a limited sliding movement on the frame member, after installation, to accommodate itself to expansion or contraction of the wallboard which is held by the fastener.

To these and other ends the invention resides in certain improvements and combinations of parts, all as will be hereinafter more fully described, the novel features being pointed out in the claims at the end of the specification.

In the drawing.

The same reference numerals throughout the several views indicate the same parts.

So-called "blind fasteners" for wallboard are well known in a general way. One form of such fastener is shown in Winship Patent No. 2,120,049, granted June 7, 1938, but the form of fastener there shown requires nails for fastening it to a support. Consequently, such fastener is not well adapted for use with masonry walls or with walls having steel or other metal studding or framing. In using fasteners of the type shown in this patent on such walls, it has heretofore been necessary to secure a strip of wood to the masonry or to the metal framing in order to provide material into which nails can be driven.

The present invention obviates the use of any wood and provides a wall board fastener of the "blind" type which may be attached directly to metal studding or framing, or to a metal insert suitably placed or anchored in a masonry wall, the invention being especially adapted to use on a metal flange having two free edges or undercut edges, such as a flange forming part of a T-shaped section, as distinguished from one flange of a conventional angle bar, which has only one undercut free edge.

Figure 1:
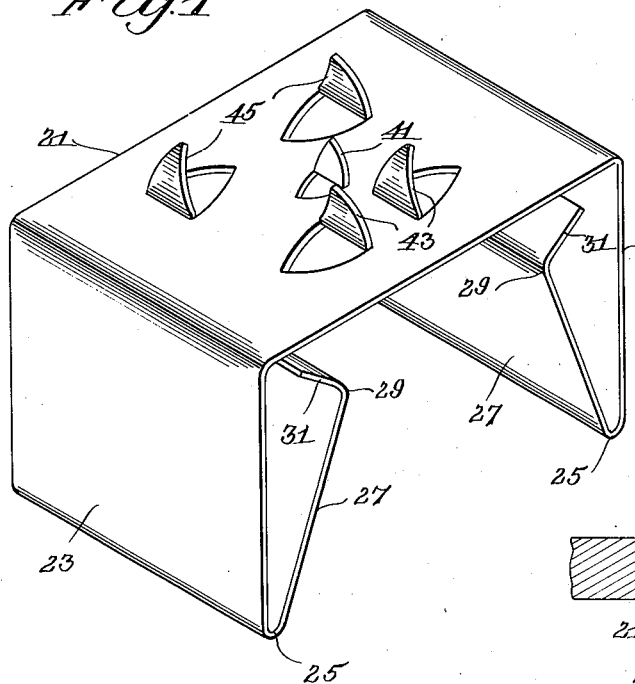
Fig. 1 is a perspective view of a fastener in accordance with a preferred embodiment of the invention.
Figure 3:
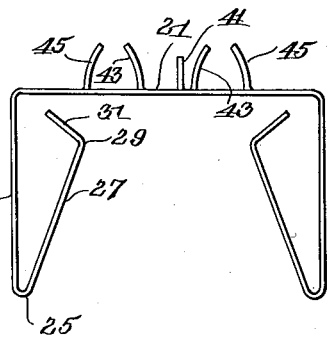
Fig. 3 is an end elevation thereof.
Figure 2:
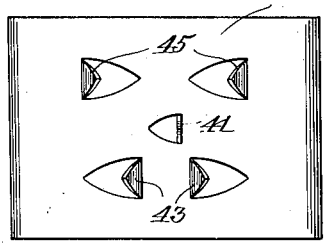
Fig. 2 is a plan thereof.

Referring now to Figs. 1, 2, and 3, the fastener comprises a metallic plate of somewhat resilient sheet metal such as steel, having a main body portion or front 21, a pair of side flanges or legs 23 extending rearwardly from opposite edges of the main body 21, at approximately a right angle thereto, these flanges 23 being sharply bent as at 25, some distance rearwardly of the plate 21, through an angle of almost 180° (say about 160° or 170°, for example) to form inner leg portions 27 extending obliquely forwardly toward the front plate 21, the metal being further bent at 29 through an angle of roughly about 80°, beyond which bend the metal forms a terminal flange 31 on each leg 27.

Struck upwardly from the main body plate 21 and extending or projecting forwardly therefrom are suitable ears or prongs on which wallboard or the like may be impaled for fastening purposes. The exact location and shape of these prongs may be varied as desired. For example, there may be a central prong 41 which is straight, and sufficiently short so that it will not extend through the entire thickness of the wallboard with which this fastener is to be used. There may also be a plurality of longer curved prongs grouped around this central prong 41, such as the pair of prongs 43 curved outwardly away from each other, and the pair of prongs 45 curved inwardly toward each other.

Figure 4:
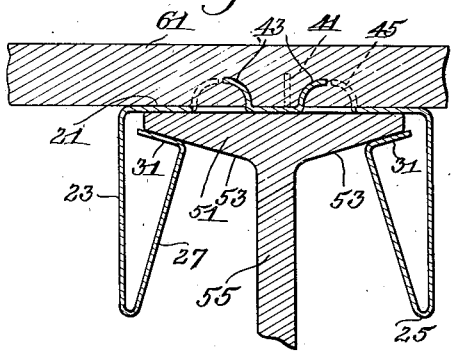
Fig. 4 is a cross section through a metal frame member with the preferred form of fastener applied thereto, and with wallboard applied to the fastener.

The size and proportions of the fastener, as well as the various angles of the bends of the metal, are designed in accordance with the size and shape of the particular frame member on which it is to be used. A fragment of a typical frame member is shown in Fig. 4, in which the portion of the frame member against which the wallboard is to be applied is the cross flange or head 51 having a flat face on which the wallboard is to be placed and having sloping or tapered undercut faces 53 leading obliquely toward a central web or flange 55, only a fragment of which is shown in the drawing. This web 55 may be connected to or form part of any other shape or size of metal member, or may be an insert to be anchored in a masonry wall.

For a frame member of given size and shape, the fastener of the present invention is preferably so designed and constructed that the distance between the sides 23 is somewhat greater than the width of the head 51 of the frame member, as shown in Fig. 4. The fastener is quickly installed on the head 51 of the frame member by placing the legs 27 so that they extend over opposite edges of the head 51 of the frame member, and then shoving the fastener by gentle pressure in a direction toward the flange 51. Usually the fastener will assume a cocked position during such shoving, one end of the fastener seating itself first at one edge of the head 51, and then the other end of the fastener snapping to its seated position over the other edge of the head 51, the fastener being finally seated in a position such as shown in Fig. 4. Due to the resilience of the metal of which the fastener is made, and the dimensions thereof, the fastener parts are kept resiliently sprung by the flange of the frame member. By this is meant that the terminal flanges 31 of the fastener are initially placed at a sharper angle to the front plate 21 than the angle of the under sides 53 of the head 51, as will be seen by comparing Fig. 3 with Fig. 4, and the bends 29 of the fastener are initially closer to each other than their final position when installed on the frame member. During the installation, the legs 27 are forced apart and they spring back somewhat after snapping over the edges of the head 51, but contact with the sloping surfaces 53 does not permit them to spring fully back to their initial positions, thus keeping them under resilient tension. Similarly the terminal flanges 31 are forced downwardly or rearwardly (increasing the angularity of the bends 29) until, in the final position, these terminal flanges 31 lie approximately or nearly flat against the under sides 53 of the head 51 of the frame member.

In designing the fasteners, care must be taken to make the legs or sides 23 long enough, with relation to the hardness and resiliency of the metal, so that the displacement of the inner legs 27 when installing the fastener will not stress the metal at the bend 25 beyond its elastic limit.

When the fasteners of the present invention have been installed at suitable intervals on the metal frame members, then the wallboard, diagrammatically indicated at 61, is installed by forcing it in a direction perpendicularly toward the fastener plate 21. This impales the wallboard 61 on the prongs 41, 43, and 45 of the fastener, causing the curved prongs 43 and 45 to bend over or clinch themselves securely in the wallboard, in the manner somewhat as indicated in Fig. 4.

After installation, if the wallboard expands or contracts due to atmospheric changes, a limited amount of slippage of the fastener on the frame member 51 is possible to accommodate such expansion or contraction without buckling of the wallboard. The fastener may slide through any reasonable limits in a direction longitudinally of the flange 51 (that is, in a direction perpendicular to the plane of the paper in Fig. 4) since nothing but friction holds the fastener against such longitudinal movement. It may also move laterally with respect to the frame member 51 (that is, in a direction right or left in Fig. 4) to a limited extent, since the flanges 23 of the fastener are spaced laterally away from opposite edges of the head 51 of the frame member, to permit such lateral movement. During such movement, the legs 27 and terminal flanges 31 of the fastener are bent slightly in one direction or the other, as required.

Figure 5:
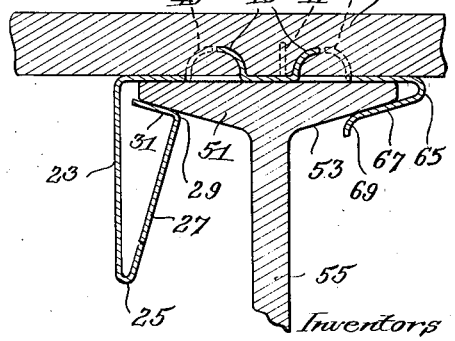
Fig. 5 is a view similar to Fig. 4, showing a modified form of the invention.

In Fig. 5 of the drawing is shown a modified form of the invention, in which one side flange 23, leg 27, and terminal flange 31 of the fastener are replaced by a bend 65 and a flange 67, at approximately the same angularity to the front plate 21 as the underside 53 of the head 51, and a terminal lip 69 slightly curved for ease of installation. The other parts of the fastener remain exactly as before, including the other side flange 23, bend 25, leg 27, and terminal flange 31, and the prongs likewise are the same. This alternative form of fastener is installed in the same way, except that the hook formed by the flange 67 is, of course, first clipped over or hooked over one edge of the frame head 51, and then the opposite end of the fastener is forced down over the opposite edge of the head 51 until the bend 29 snaps over the opposite edge of the head, completing the installation of the fastener in final position.

While certain embodiments of the invention have been disclosed, it is to be understood that the inventive idea may be carried out in a number of ways. This application is therefore not to be limited to the precise details described, but is intended to cover all variations and modifications thereof falling within the scope of the appended claims.

We claim:

1. A blind fastener for connecting a panel of wallboard or the like to a support having two free undercut edges, said fastener including a front plate of metal to rest against a face of said support, prongs extending forwardly from said front plate and adapted to have a panel impaled thereon, side arms extending rearwardly from said plate past the free edges of said support to points substantially rearwardly thereof, and legs extending obliquely forwardly from the rear portions of said side arms into contact with the undercut rear surfaces of said support.

2. A blind fastener for connecting a panel of wallboard or the like to a support having two free undercut edges, said fastener including a front plate of metal to rest against a face of said support, prongs extending forwardly from said front plate and adapted to have a panel impaled thereon, side arms extending rearwardly from said plate past the free edges of said support to points substantially rearwardly thereof, legs extending obliquely forwardly from the rear portions of said side arms toward the undercut rear surfaces of said support, and flanges at the forward edges of said legs extending laterally therefrom approximately along said rear surfaces.

3. A blind fastener for connecting a panel of wallboard or the like to a support having front and rear surfaces accessible at each of two opposite edges of the support, said fastener including a front plate of metal resting against and extending across the front surface of said support to points beyond said opposite edges, a plurality of prongs extending forwardly from said front plate and adapted to have a panel impaled thereon and held thereby, and means extending rearwardly from said front plate past each of the opposite edges of said support and contacting with a surface of said support near each of said opposite edges to retain said front plate in place on said support.

4. A blind fastener for connecting a panel of wallboard or the like to a support having front and rear surfaces accessible at each of two opposite edges of the support, said fastener including a front plate of metal resting against and extending across the front surface of said support to points beyond said opposite edges, a plurality of prongs extending forwardly from said front plate and adapted to have a panel impaled thereon and held thereby, and resilient means extending rearwardly from said front plate past each of the opposite edges of said support and contacting with a surface of said support near each of said opposite edges to retain said front plate in place on said support.

5. A blind fastener for connecting a panel of wallboard or the like to a support having front and rear surfaces accessible at each of two opposite edges of the support, said fastener including a front plate of metal resting against and extending across the front surface of said support to points beyond said opposite edges, a plurality of prongs extending forwardly from said front plate and adapted to have a panel impaled thereon and held thereby, and means extending rearwardly from said front plate past each of the opposite edges of said support and contacting with a rear surface of said support near each of said opposite edges to retain said front plate in place on said support, said means extending past one of said edges of said support including an arm extending rearwardly to a substantial distance behind said rear surface of said support and a portion extending forwardly from said arm into contact with said rear surface of said support.

6. A blind fastener for connecting a panel of wallboard or the like to a support having front and rear surfaces accessible at each of two opposite edges of the support, said fastener including a front plate of metal resting against and extending across the front surface of said support to points beyond said opposite edges, a plurality of prongs extending forwardly from said front plate and adapted to have a panel impaled thereon and held thereby, and means extending rearwardly from said front plate past each of the opposite edges of said support and contacting with a surface of said support near each of said opposite edges to retain said front plate in place on said support, said means extending past one of said edges of said support including a side having a portion extending rearwardly from said front plate in a location laterally offset from the adjacent edge of said support and a portion extending forwardly from said rearwardly extending portion into contact with said support near said adjacent edge thereof, said rearwardly extending portion and said forwardly extending portion of said side connecting with each other at a location materially removed from said adjacent edge of said support to provide relatively long lever arms capable of substantial lateral displacement while said fastener is being installed on said support.

7. A blind fastener for connecting a panel of wallboard or the like to a support having front and rear surfaces accessible at each of two opposite edges of the support, said fastener including a front plate of metal resting against and extending across the front surface of said support to points beyond said opposite edges, a plurality of prongs extending forwardly from said front plate and adapted to have a panel impaled thereon and held thereby, and means extending rearwardly from said front plate past each of the opposite edges of said support and contacting with a surface of said support near each of said opposite edges to retain said front plate in place on said support, said means extending past one of said edges of said support including a portion forming an acute angle with said front plate and constituting therewith a hook-like structure adapted to be hooked over said one of said edges of said support.

8. A blind fastener for connecting a panel of wallboard or the like to a support having front and rear surfaces accessible at each of two opposite edges of the support, said fastener including a front plate of metal extending across the front surface of said support to points beyond said opposite edges, a plurality of prongs extending forwardly from said front plate and adapted to have a panel impaled thereon and held thereby, a hook-like portion at one side of said front plate to be hooked over one edge of said support to retain said side of said plate thereon, and means at the opposite side of said plate to extend around the opposite edge of said support to retain said opposite side of said plate on said support.

9. A blind fastener for connecting a panel of wallboard or the like to a support having front and rear surfaces accessible at each of two opposite edges of the support, said fastener including a front plate of metal extending across the front surface of said support to points beyond said opposite edges, a plurality of prongs extending forwardly from said front plate and adapted to have a panel impaled thereon and held thereby, a hook-like portion at one side of said front plate to be hooked over one edge of said support to retain said side of said plate thereon, a portion extending rearwardly from the opposite side of said plate, and a portion extending forwardly from said rearwardly extending portion and engaging said support near the other edge of said support to retain said opposite side of said plate in position on said support.

10. A blind fastener for connecting a panel of wallboard or the like to a support having front and rear surfaces accessible at each of two opposite edges of the support, said fastener including a front plate of metal resting against and extending across the front surface of said support to points beyond said opposite edges, a plurality of prongs extending forwardly from said front plate and adapted to have a panel impaled thereon and held thereby, and means at opposite sides of said plate for extending around opposite edges of said support to retain said plate thereon, the retaining means at least at one side of said plate including resilient legs so shaped as to act as a spring latch displacement by contact with said support while being installed thereon and automatically springing to latching position upon completion of installation movement.

CHARLES A. UPSON.
ROSS WINSHIP.